No. 765,898. Patented July 26, 1904.

UNITED STATES PATENT OFFICE.

CHARLES LEWIS, OF TORONTO, CANADA.

PROCESS OF EXTRACTING SOLUBLE ALBUMEN FROM MILK.

SPECIFICATION forming part of Letters Patent No. 765,898, dated July 26, 1904.

Application filed November 14, 1902. Serial No. 131,333. (No specimens.)

*To all whom it may concern:*

Be it known that I, CHARLES LEWIS, chemist, a citizen of the Dominion of Canada, and a resident of the city of Toronto, in the county of York and Province of Ontario, Canada, have invented or discovered a new and useful manufacture or composition of matter consisting in an Improvement in Processes of Extracting Soluble Albumen from Milk for Use as a Concentrated Food, of which the following is a specification.

My invention relates to the manufacture of soluble albumen from milk; and its novelty consists in the several successive steps of the process employed and in the product resulting therefrom.

In carrying out my process I first take sweet clean milk and remove the fat therefrom in any well-known manner, preferably in a cream-separator. This gives, in effect, skim-milk. I then add to the skim-milk a suitable quantity of grain alcohol until precipitation of the albumen has ceased. This can best be ascertained by filtering a small sample and adding clear alcohol to the filtrate. Of course any other of the tests for albumen may be employed; but the one suggested is simple and practical. If the process is being carried out in a commercial way, this step should take place in a large tank holding several hundred gallons and under conditions adapted to exclude the air in order to prevent the undue evaporation of the alcohol. The precipitate, which is in the form of casein, is next separated from the remaining liquid. This can best be accomplished by straining in the first place and in the second place by the application of heat to drive off the alcohol not removed by the purely-mechanical means. There will always be some water developed from the milk, and after the bulk of the liquid has been removed by straining I have found it advisable to add a small proportion of strong alcohol before heating. This constricts the curd to a certain extent and makes it more readily driable.

The drying can best be done in drying-closets of suitable size and form through which there is caused constantly to pass a current of air at a temperature of about 148° Fahrenheit, but not above 149°. Care should be taken that the temperature does not exceed 149°, because if it does the precipitated albumen is apt to become insoluble, or at least insoluble in the gastric juice of the human stomach. When the albumen or casein is thus dried, it will consist of a tough-horny mass which must be converted into a finely-divided state. This is preferably best accomplished by grinding it in a roller-mill having both plain and corrugated rolls. As some of the alcohol is apt to be entrained in the horny precipitate, it is well to conduct the grinding operation in the presence of a current of hot air, which will carry off any alcohol so entrained and which will be released during this operation and at any rate to cause a current of hot air to be passed over the powder after grinding. The ground albumen is then ready for use. It may be taken mixed with water or milk or in beef-tea, cocoa, or other hot liquid, provided the temperature of such fluid does not exceed 150°.

I am well aware that, speaking in general terms, it has long been known that alcohol when added to a fluid containing albumen will sometimes precipitate it. Advantage has been taken of this reaction to employ it as a test for the presence of albumen in urine, although this reaction is not very reliable, because urates are frequently precipitated as well; but this supposed reaction is not always reliable and does not always take place, for instance, in the presence of other ingredients such as occur in pharmaceutical preparations; but, so far as I know, no one has heretofore employed this reaction in a practical way for the separation of casein from milk, and the reason I do this is because I have discovered that if milk in the natural state is taken into the stomach the albumen or casein is curded by the pepsin in the stomach along with the other gastric fluids; but when the casein has been removed from the milk by precipitation with alcohol and then dried and redissolved in water then it is no longer curded by the pepsin of the stomach. In other words, I have converted the casein from an insoluble into a soluble form and that, too, without losing any of its food